United States Patent [19]

Steinberger et al.

[11] Patent Number: 4,655,964

[45] Date of Patent: Apr. 7, 1987

[54] CONDUCTIVE NYLON MOLDING MATERIALS

[75] Inventors: Rolf Steinberger, Schifferstadt; Johannes Schlag, Ludwigshafen; Karl Schlichting, Bobenheim-Roxheim; Erhard Seiler, Ludwigshafen; Sibylle Von Tomkewitsch, Poecking; Hans-Friedrich Schmidt, Eurasburg, all of Fed. Rep. of Germany

[73] Assignee: BASF Aktiengesellschaft, Fed. Rep. of Germany

[21] Appl. No.: 754,013

[22] Filed: Jul. 11, 1985

[30] Foreign Application Priority Data

Jul. 12, 1984 [DE] Fed. Rep. of Germany ......... 3425628

[51] Int. Cl.$^4$ .............................................. H01B 1/06
[52] U.S. Cl. ..................................... 252/511; 252/508; 252/509; 524/495; 524/496; 524/445; 524/456
[58] Field of Search ............... 252/511, 506, 508, 509; 524/495, 496, 445, 456; 525/183, 184

[56] References Cited

U.S. PATENT DOCUMENTS 4,554,320 11/1985 Reimann et al. .................. 524/456
4,562,221 12/1985 Shigemitsu .......................... 525/183

FOREIGN PATENT DOCUMENTS 1457815 5/1985 United Kingdom ..................... 77/6

OTHER PUBLICATIONS

"Kunststoffberater", Band 22, 1977, pp. 263-265, (no copy available).
"Fillers for Plastics", Iliffe Books, London, 1971, pp. 32-37.

Primary Examiner—Josephine L. Barr
Attorney, Agent, or Firm—Keil & Weinkauf

[57] ABSTRACT

Conductive molding materials contain
(A) from 29 to 76% by weight of one or more linear thermoplastic nylons,
(B) from 20 to 50% by weight of finely divided calcined kaolin and/or finely divided calcium metasilicate, which are coated with organosilanes as coupling agents,
(C) from 4 to 6% by weight of conductive carbon black having a BET specific surface area $>900$ m$^2$/g and a DBP absorption $>300$ ml/100 g and, if required,
(D) from 0 to 15% by weight of conventional additives in effective amounts, the percentages of A to D summing to 100.

7 Claims, No Drawings

CONDUCTIVE NYLON MOLDING MATERIALS

The present invention relates to conductive nylon molding materials which contain silicate filter and conductive carbon black.

Plastics, such as thermoplastic nylons, have a high resistivity and are therefore insulators. For many fields of use, this property is a great disadvantage, since the electrostatic surface charges produced by friction remain on the particular article and lead to a large variety of problems ranging from, for example, the relatively harmless buildup of charge when carpets are walked on to the destruction of information on magnetic data media or the risk of explosion when ignitable mixtures are present.

However, this disadvantage can be overcome by adding electrically conductive substances, such as metal powders or conductive carbon black. Particularly where the latter is used, a wide range of resistivities can be obtained by varying the concentration, as disclosed in "Kunststoffberater" 22 (1977), 262–265.

On the other hand, such additives have a serious adverse effect on the other properties of the plastics, for example the outstanding impact resistance of the nylon, and hence exclude many fields of use opened up by the improved conductivity. German Laid-Open Application DOS No. 1,965,434 and European Pat. No. 23,635 disclose nylon molding materials which contain organosilane-coated mineral fillers in order to improve their heat distortion resistance and to achieve isotropic shrinkage and distortion behavior. However, in view of German Laid-Open Application DOS No. 1,965,434, page 2, it is to be assumed that such additives do not eliminate the disadvantageous action of carbon black.

It is an object of the present invention to provide nylon molding materials which possess good electrical conductivity, exhibit rapid discharge from the surface and have good mechanical properties, in particular high impact resistance.

We have found that this object is achieved by conductive nylon molding materials containing (A) from 29 to 76% by weight of one or more linear thermoplastic nylons, (B) from 20 to 50% by weight of one or more silicate fillers, (C) from 4 to 69% by weight of conductive carbon black and, if required, (D) from 0 to 15% by weight of conventional additives in effective amounts, the percentages summing to 100 in each case, wherein the molding materials contain, as component B, finely divided calcined kaolin and/or finely divided calcium metasilicates which are coated with organosilanes as coupling agents, and, as component C, conductivity carbon black having a BET specific surface area >900 $m^2/g$ and a DBP absorption >300 ml/100 g.

The advantages of the novel molding materials are that they possess good electrical conductivity and, in particular, the surface electric charge is conducted away rapidly, and furthermore the mechanical properties of the nylon are substantially retained. In particular, the novel molding materials have good impact resistance enabling them to be used widely.

The novel molding materials are noteworthy in that the addition of mineral fillers was not expected to influence the adverse effects of the addition of carbon black. According to Germain Laid-Open Application DOS No. 1,965,434, page 2, paragraph 1, fillers, such as carbon black, and silicate fillers, such as clay, are in fact both regarded as having the same adverse effect on the impact resistance of the nylon. Moreover, fillers for plastics, London, Iliffe Books, 1971, page 33, discloses that the addition of calcium metasilicate imparts improved electrical insulation properties to nylon. It therefore did not appear appropriate to use wollastonite as a filler, since a reduction in the electrical conductivity was to be expected.

The linear thermoplastic nylons (component A) used are preferably saturated linear nylons having a K value (measured according to Fikentscher, Cellulosechemie, 13 (1932), 58, in 1% strength by weight solution in concentrated sulfuric acid) of from 60 to 80. Examples of suitable nylons are polycaprolactam (nylon 6), polyhexamethyleneadipamide (nylon 6,6), polyhexamethylenesebacic acid amide, polylaurolactam, polyundecanamide, nylon homopolymers and copolymers prepared using adipic acid, azelaic acid, sebacic acid, dodecanedioic acid or terephthalic acid on the one hand and hexamethylenediamine, trimethylhexamethylenediamine, bis-(4-aminocyclohexyl)-methane or 2,2-bis-(4'-aminocyclohexyl)-propane on the other hand, and nylon copolymers obtained by condensation of lactams with the abovementioned dicarboxylic acids and diamines. Mixtures of the above nylon homopolymers are also suitable. Nylon 6 and nylon 6,6 have become particularly important. The molding materials according to the invention contain from 29 to 76, in particular from 44 to 71, % by weight of nylon.

The novel molding materials contain, as component B, from 20 to 50, in particular from 25 to 35, % by weight of calcined kaolin and/or calcium metasilicate, which are coated with organosilanes as coupling agents.

It is preferable to use calcined kaolin which has an $Al_2O_3$ content of from 44 to 45% by weight and an $SiO_2$ content of from 52 to 54% by weight and is advantageously obtainable by thermal treatment of the naturally occurring aluminum silicates kaolin or kaolinite at from 800° to 1300° C. Advantageously, the finely divided calcined kaolin has a particle size of from 0.01 to 10 $\mu m$, in particular from 0.05 to 3 $\mu m$, and preferably possesses a BET specific surface area >6, preferably from 10 to 20, $m^2/g$.

Another silicate filler which is suitable as component B is calcium metasilicate (wollastonite), the particle size of which is advantageously from 0.01 to 30 $\mu m$, in particular from 0.5 to 20 $\mu m$. Acicular calcium metasilicate having a particle diameter of from 0.01 to 15 $\mu m$ and a particle length of from 2 to 90 $\mu m$ is particularly useful.

The novel silicate fillers can be used individually or as a mixture with one another.

The novel fillers, calcined kaolin and calcium metasilicate, are coated with organosilanes as coupling agents. Advantageously, they contain from 0.1 to 3, in particular from 0.5 to 2, % by weight, based on the amount of the filler, of silanes. Organosilanes which can be used for coating are described in, for example, German Laid-Open Application DOS No. 1,965,434. Aminoalkyldialkoxysilanes, eg. δ-aminopropyltriethoxysilane, are particularly useful.

Conductive carbon blacks used as component C are those having a BET specific surface area >900, in particular from 950 to 1500, $m^2/g$ and large pore volumes, characterized by DBP values >300, in particular from 300 to 500, ml/100 g. The DBP parameter is measured according to DIN 53 601. The novel molding materials contain from 4 to 6% by weight of conductive carbon black.

The molding materials according to the invention may furthermore contain conventional additives and assistants (component D) in an amount of from 0 to 15% by weight. Of course, the stated percentages for components A to D sum to 100 in each case. Suitable additives and assistants are phenol-based, amine-based or copper-based UV, heat and hydrolysis stabilizers, as well as lubricants, slip agents and release agents, colored pigments and flameproofing agents.

Stabilization is particularly preferably carried out using salts of monovalent copper, preferably copper(I) acetate or copper(I) chloride, bromide or iodide. They are advantageously present in amounts corresponding to 5–500 ppm, preferably 10–250 ppm, based on the nylon, of copper. It is particularly advantageous if the copper is present in the form of a molecular dispersion in the nylon. This is achieved if a concentrate which contains the nylon, a salt of monovalent copper and an alkali metal halide or alkaline earth metal halide in the form of a solid homogeneous solution is added to the molding material. A typical concentrate consists of, for example, from 79 to 95% by weight of nylon and from 21 to 5% by weight of a mixture of copper iodide or bromide and potassium iodide or calcium bromide.

Additives (component D) may also be substances which improve the toughness, such as crosslinked or non-crosslinked rubber-like polymers. Non-crosslinked ternary copolymers of
(a) from 52 to 79.5% by weight of ethylene,
(b) from 20 to 40% by weight of one or more primary or secondary $C_2-C_8$-alkyl esters of (meth)acrylic acid and
(c) from 0.5 to 8% by weight of a monomer possessing an acidic functional group or latent acidic functional group
are advantageously used, the sum of components (a), (b) and (c) being 100% by weight. Suitable copolymers are described in, for example, German Laid-Open Application DOS No. 3,220,380.

Other preferred substances (D) which improve the toughness are partially or completely crosslinked polymers which are prepared by emulsion polymerization and are elastomeric in a particle size distribution with a particle size of less than 2 $\mu$m, essentially predetermined by the emulsion polymerization. Such rubber-like polymers are obtained by, for example, polymerization of an emulsion of suitable monomers, such as butadiene, isoprene or higher alkyl esters of acrylic acid or methacrylic acid, in the presence or absence of as much as 30% by weight of monomers, such as styrene, acrylonitrile, methyl acrylate, methyl methacrylate or vinyl methyl ether, which give hard polymers during the polymerization. The elastomeric polymers usually employed are polybutadiene, butadiene/styrene copolymers having a styrene content of less than 30% by weight, butadiene/(meth)acrylate copolymers and (meth)acrylate homopolymers which may contain small amounts of crosslinking monomers. Particularly preferred polymers are elastomeric poly(meth)acrylates, such as poly-n-butyl acrylate, poly-hexyl acrylate and poly-2-ethylhexyl acrylate, which may or may not contain, as copolymerized units, small amounts, about 0.1–6% by weight, of a monomer possessing carboxyl groups, groups which give a carboxylic acid, or carboxamide groups, eg. (meth)acrylic acid, tert.-butyl acrylate, fumaric acid, acrylamide or methacrylamide. The presence of from 1 to 10% by weight of these monomers, at least in the surface shell of the polymer particles, results in improved adhesion to the nylon matrix. Suitable polymers are described in, for example, European Pat. No. 82,020.

Advantageously, the abovementioned additives which improve toughness are used in amounts of from 2 to 15, in particular from 5 to 10, % by weight, based on the molding material.

The conductive molding materials according to the invention advantageously have an impact resistance (according to DIN 53 453) of from 40 to 100 kg/m$^2$ and a surface electrical resistance (according to DIN 53 482) of from $10^7$ to $10^{11}$ $\Omega$. cm.

The novel molding materials are prepared in the relevant conventional apparatuses for the production of filled thermoplastics, such as single-screw or twin-screw extruders or screw kneaders. As a rule, the starting material used consists of nylon granules, which are melted at from 250° to 310° C. The coated silicate filler is advantageously metered in at the same point as the nylon granules. Other additives, such as copper stabilizers or toughness-improving agents, may also be added at this point. The conductivity carbon black is preferably added at a point of the extruder where the remaining components of the mixture are already present as a homogeneous melt.

In a preferred procedure, all components of the mixture, except for the conductive carbon black, are mixed homogeneously in an extruder, extruded and granulated, these operations being carried out in a first step, after which, in a second step, the resulting granules are melting again and mixed with conductive carbon black. This procedure permits particularly exact adjustment of the carbon black concentration and particularly homogeneous mixing of all components.

The molding materials according to the invention are suitable for the production of shaped articles by injecting molding or extrusion.

The Examples which follow illustrate the invention. Percentages are by weight.

EXAMPLES 1 TO 10

In a twin-screw extruder (type ZSK from Werner & Pfleiderer), nylon 6 having a K value of 72, a copper(I) iodide/potassium iodide stabilizer concentrate based on nylon 6, silanized wollastonite having a mean particle size of 10 $\mu$m and, if appropriate, a non-crosslinked ternary ethylene copolymer were melted at from 250° to 300° C. and mixed homogeneously with one another, the mixture was extruded, the extrudats were cooled and granulated, and the granules were dried.

The granules thus obtained were melted again in a twin-screw extruder, conductive carbon black having a BET specific surface area of 1000 m$^2$/g and a DBP absorption of 400 ml/100 g was introduced, the components were mixed to give a homogeneous mixture, and the latter was processed to granules as described above.

The granules were converted to test specimens by injection molding at 280° C., and the impact resistance was determined according to DIN 53 453. Moreover, circular disks (60$\times$2 mm) were produced by injection molding, and the surface resistance $R_S$ was determined according to DIN 53 482 in the central zone of the disk.

For further characterization of the conductivity, the discharge behavior of these circular disks was determined, this being done by charging the said discs to 2000 V in an appropriately designed plate capacitor and monitoring the drop in potential when the capacitor was earthed, as a function of time, with the aid of a static voltmeter. In this arrangement, the circular disk forms the dielectric of the capacitor. In conductive samples, the charge is substantially conducted away (residual charge $\leq 100$ V) within $\leq 100$ milliseconds. All tests were carried out on freshly injection-molded test specimens.

Details, such as the composition of the molding materials and their properties, are shown in the Table below.

TABLE

| Example No. | Nylon 6[1] [% by wt.] | Wollastonite [% by weight] | Ethylene copolymer[2] [% by weight] | Conductive carbon black [% by weight] | Impact resistance $a_n$ [kJ/m$^2$] | Surface resistance $R_S$ [$\Omega \cdot$ cm] | Residual charge after 100 msec [V] |
|---|---|---|---|---|---|---|---|
| 1. Molding materials not according to the invention | | | | | | | |
| 1 | 98 | — | — | 2 | 115 | $1.10^{13}$ | 1100 |
| 2 | 96 | — | — | 4 | 81 | $8.10^{12}$ | 1000 |
| 3 | 95 | — | — | 5 | 55 | $5.10^{12}$ | 1000 |
| 4 | 94 | — | — | 6 | 39 | $5.10^{11}$ | 700 |
| 5 | 92 | — | — | 8 | 28 | $3.10^{6}$ | 0 |
| 2. Molding materials according to the invention | | | | | | | |
| 6 | 68 | 30 | — | 2 | 101 | $5.10^{12}$ | 1100 |
| 7 | 66 | 30 | — | 4 | 85 | $1.10^{11}$ | 100 |
| 8 | 65 | 30 | — | 5 | 72 | $8.10^{7}$ | 30 |
| 9 | 64 | 30 | — | 6 | 56 | $3.10^{6}$ | 0 |
| 10 | 55 | 30 | 10 | 5 | 95 | $3.10^{7}$ | 0 |

[1]Nylon 6 containing 1% of CuI/KI stabilizer concentrate, corresponding to 40 ppm of Cu
[2]Copolymer of 65% by weight of ethylene, 30% by weight of n-butyl acrylate and 5% by weight of acrylic acid MFI = 10 g/10 min

We claim:

1. A conductive molding material containing
    (A) from 29 to 76% by weight of one or more linear thermoplastic nylons,
    (B) from 20 to 50% by weight of finely divided calcined kaolin or finely divided calcium metasilicate and mixtures thereof, which are coated with organosilanes as coupling agents,
    (C) from 4 to 6% by weight of conductive carbon black having a BET specific surface area $>900$ m$^2$/g and a DBP absorption $>300$ ml/100 g and, if required,
    (D) from 0 to 15% by weight of conventional additives in effective amounts,
the percentages of A to D summing to 100.

2. A molding material as set forth in claim 1, which contains calcined kaolin having a particle size of from 0.01 to 10 $\mu$m and a BET specific surface area $>6$ m$^2$/g.

3. A molding material as set forth in claim 1, which contains calcium metasilicate having a particle size of from 0.01 to 30 $\mu$m.

4. A molding material as set forth in claim 1, which contains acicular calcium metasilicate having a particle diameter of from 0.1 to 15 $\mu$m and a particle length of from 2 to 90 $\mu$m.

5. A molding material as set forth in claim 1, which contains from 2 to 15% by weight of a non-crosslinked copolymer containing three or more components which consists of
    (a) from 52 to 79.5% by weight of ethylene,
    (b) from 20 to 40% by weight of one or more primary or secondary $C_2$-$C_8$-alkyl esters of (meth)acrylic acid and
    (c) from 0.5 to 8% by weight of a monomer possessing acidic functional groups or latent acidic functional groups,
the components (a) to (c) summing to 100.

6. A molding material as set forth in claim 1, which contains from 2 to 15% by weight of a partially or completely crosslinked polymer which is prepared by emulsion polymerization and is elastomeric in a particle size distribution with a particle size of less than 2 $\mu$m, which is essentially predetermined by the emulsion polymerization.

7. A molding material as set forth in claim 1, which contains from 5 to 500 ppm, based on the amount of nylon, of copper(I) compounds in homogeneous form.

* * * * *